Nov. 18, 1958  F. W. AINSWORTH  2,860,606
SERVO CONTROL VALVE
Filed Nov. 17, 1954  2 Sheets-Sheet 1

INVENTOR
FRANK W. AINSWORTH

BY *Alan M. Staubly*

ATTORNEY

Nov. 18, 1958
F. W. AINSWORTH
2,860,606
SERVO CONTROL VALVE
Filed Nov. 17, 1954
2 Sheets-Sheet 2
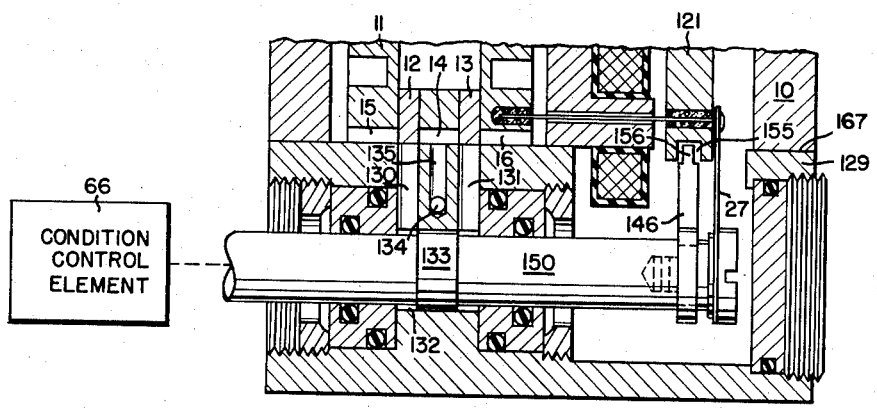
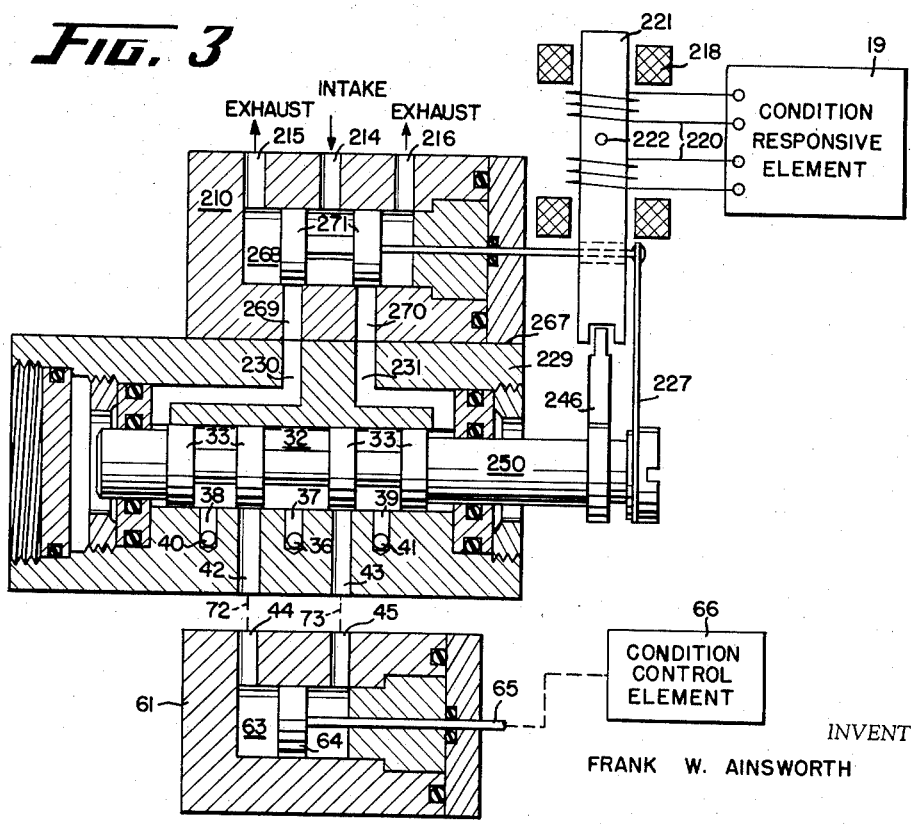
INVENTOR
FRANK W. AINSWORTH
BY Alan M. Staubly
ATTORNEY United States Patent Office 2,860,606
Patented Nov. 18, 1958

2,860,606

SERVO CONTROL VALVE

Frank W. Ainsworth, Minneapolis, Minn., assignor to Minneapolis-Honeywell Regulator Company, Minneapolis, Minn., a corporation of Delaware Application November 17, 1954, Serial No. 469,366

7 Claims. (Cl. 121—46.5)

This invention relates to improvements in valve control of the type having feedback mechanism therein for varying the position of the control mechanism, particularly when used with valves and the like.

Various devices are currently available that provide feedback motion from the valve member being moved, to the valve member controlling such movement. These devices operate only when the controlling member is free to move, but are inoperative when some obstacle, such as dirt, wedges the valve of the controlling member, thereby inhibiting valve movement. It is apparent that the existence of the latter condition is undesirable. Especially is this true when rapid response to the feedback signal is imperative, for example in the control of wing and tail surfaces of high speed air craft, where lack of control, even momentarily, can be disastrous.

It is, therefore, an object of this invention, to provide a mechanical feedback arrangement in a valve which will operate to overcome foreign material found in the valve chamber, by shearing or grinding such material, through positive action on the valve itself.

It is another object of this invention, to produce a feedback mechanism that can be relied on to transmit the feedback signal, regardless of the foreign material encountered in the valve chamber.

It is a further object of this invention to provide a feedback arrangement of simple and economical design.

Other objects and advantages of this invention will become apparent upon reading the following description of the invention and the appended claims.

Figure 2 is a sectional view of a single stage servo valve showing a modification of the invention shown in Figure 1.

Figure 3 is a sectional view of another type of two stage servo valve utilizing the invention.

The present invention provides a mechanical feedback arrangement capable of overcoming foreign material found in the valve chamber causing to wedge the valve. This is accomplished by placing a positive connection between the member being moved and the member controlling such movement, which comes into operation after a predetermined travel of the member being controlled. The result is a shearing or grinding of the obstacle retarding movement.

Figure 1:
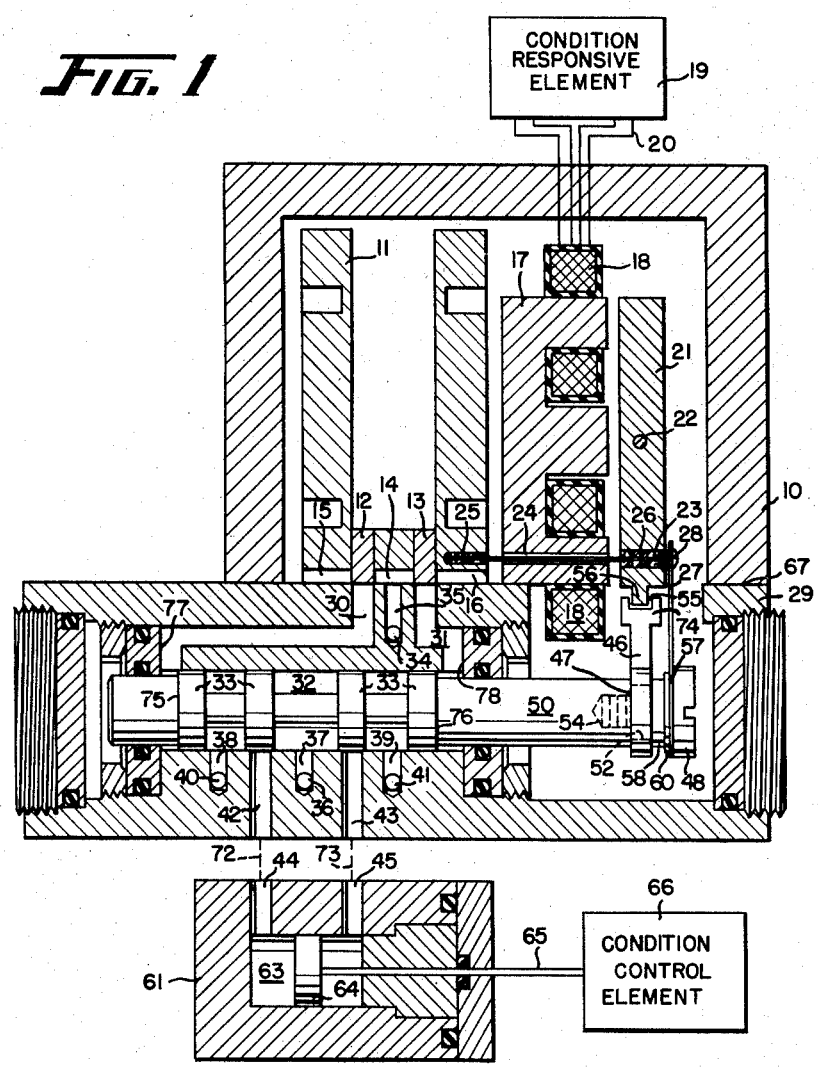
Figure 1 is a sectional view of a two stage servo valve embodying the invention.
Figure 4:
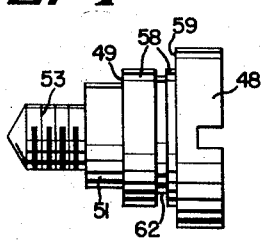
Figure 4 is a view of a member common to Figures 1, 2 and 3 drawn to a larger scale.

Referring to Figure 1 of the drawing, numeral 10 refers to the housing of the first stage servo valve. Valve body 11 contained within the housing 10 has two valve plugs, 12 and 13, an inlet passage 14, and two exhaust passages 15 and 16, which lead to the interior of the housing 10 and thence to a sump drain through a passage, not shown.

Adjacent to the valve body is a torque motor, the stator of which is designated by numeral 17. The coils 18 are connected to the condition responsive element 19 by wire leads 20. An armature 21 of the torque motor rotates about a pivot pin 22. Valve stem 23 passes through and moves freely in the opening 24 provided in the stator 17, but is held firmly in place in the recess 25 found in the valve body 11, by cementing or any other suitable means, and is cemented in position, or held by any other suitable means in the opening 26 of the armature 21. A spring member 27 is fastened by suitable means such as by welding to the valve stem at 28.

To the first stage valve housing 10, along the surface 67, is sealingly fastened by bolts, not shown, or other suitable means, the second stage servo valve body 29, which has two ports 30 and 31 in line with valve lands 12 and 13 of the first stage servo valve. These ports lead to opposite ends of a valve chamber 32 containing a spool valve 33.

The pressure fluid for the first stage servo valve enters through orifice 34 from a pressure source not shown and passes to the port 35, which communicates with the inlet passage 14 of the first stage servo valve. The pressure fluid for the second stage valve is supplied through orifice 36 from a pressure source not shown and port 37, and exhausts through port 38 and 39 and orifices 40 and 41 to a sump not shown. Ports 42 and 43 of the second stage servo valve communicate with ports 44 and 45 and chamber 63 of the actuator cylinder 61, shown in reduced scale, suitable fluid connecting means, shown schematically at 72 and 73.

The fastener 48 has a turned down portion 51 which fits in the bore 52 of member 46, and the turned down portion 51 is of such a width that when screw 53 is engaged within thread opening 54 and tightened, shoulder 47 of the spool valve stem 50 and shoulder 49 of the fastener 48 bear against member 46 holding it in position. Member 46 has a forked or pronged portion 74 with a groove 55 therein, which is wider than the tongue 56 of the armature 21 that it straddles. The difference in the respective widths of the groove 55 and the tongue 56 is a design consideration of the particular application, and results in gaps between the two members which in effect governs the lost motion allowable. Thus it is required that a sufficient gap be provided to allow movement of the spool valves 33, so as to properly control the actuator 64, and yet hold the gaps between the tongue 56 and the groove 55 to such dimensions that the spool valve surfaces 75 or 76 do not engage chamber surfaces 77 or 78 respectively, before the forked or pronged portion 74 has overcome a lost motion gap and made a positive connection with the tongue 56, forcing first stage servo valve movement.

Spring 27 extends downwardly from its attachment at point 28 with valve stem 23, its bore 57 being of such a diameter as to receive the portion 58 of the fastener 48; it is positioned against shoulder 59 and held in place by retaining ring 60, which is positioned in the groove 62.

The actuator body 61, which is attached to the second stage valve 29 by the connecting means 72 and 73, contains a chamber 63 wherein an actuator 64 is placed. The actuator rod 65 connects the actuator 64 and the condition controlled element 66 which is found outside the actuator valve body.

Figure 2 shows the application of the invention to a single stage servo valve, wherein the actuator body 129 is sealingly attached by bolts, not shown, or other suitable means to the servo valve housing 10 along surface 167. Ports 130 and 131 are placed in line with valve lands 12 and 13 of the servo valve. Orifice 134 connects to a pressure source not shown and to port 135, which communicates with the inlet passage 14 of the first stage servo valve body 11. Actuator chamber 132 contains the actuator 133 to which is connected the actuator stem 150. The tongue and groove arrangement of Figure 1 has been inverted, so that the groove 155, is now placed in the armature 121, and the tongue 156, is a part of the member 146.

In Figure 3 the first stage valve utilizes a spool valve 271 of standard design within valve chamber 268. The intake port of the first stage valve is indicated by numeral 214, and the exhaust ports are indicated by numeral 215 and 216. Ports 269 and 270 located in the first stage valve body 210 communicate with ports 230 and 231 of the second stage body 229. The first stage valve body 210 is sealing connected by bolts, not shown, or other suitable means to the second stage valve body along surface 267. Member 246 is of the design set forth in the description of Figure 2, and both member 246 and spring 227 are attached to valve stem 250 as set forth in the description of Figure 1. Because of the different first stage valve design in this figure from that of Figure 1, another type torque motor is used having an armature 221, an armature pivot 222, and coils 218 with leads 220 connecting the torque motor and the condition responsive element 19.

The arrangement of Figure 1 operates in the following manner to produce the novelty claimed:

When the condition responsive element 19 receives a signal from an outside source, not shown, it transmits a signal by means of an electric current to the leads 20 and thus to the coils 18, resulting in the creation of magnetic fields. These magnetic fields cause rotation of the armature 21 about its pivot 22, clockwise or counterclockwise depending on the relationship between the polarity of the armature 21 and the polarity developed in the stator 17 due to the direction of flow of electric current. The rotation causes the valve stem 23 to move the valve body 11 and the valve lands 12 and 13 exposing port 30 to the inlet channel 14, and the fluid under pressure therein developed by an outside source not shown, and port 31 to the exhaust channel 16; or vice versa port 30 communicating with the exhaust channel 15 and port 31 with the intake channel 14, depending which way the valve body 11 is moved. This valve body movement and consequent opening of ports introduces fluids under pressure to one side or the other of the second stage spool valve 33, depending on the valve body movement. Likewise exhaust occurs in the portion of the valve chamber 32 opposed to the incoming fluid pressure. Thus, movement of the spool valve 33 occurs, opening ports 42, 44 and 43, 45 to the pressure source of the second stage valve orifice 36, port 37 or the exhaust thereof port 38 orifice 40 port 39 orifice 41, again depending on the direction of the movement of the spool valve 33.

Likewise, the movement of the actuator 64 depends upon which port is used as a high pressure port from the source 36, 37 and which port is used to exhaust to port 38 and 39. Movement of the actuator 64 and the actuator rod 65 controls the condition control element 66.

Returning to the spool valve shaft 50: As the second stage spool valve 33 moves to the right or left, depending on which way the valve body 11 of the first stage servo valve has been moved, a portion of the spring 27 attached to the spool valve stem 50 of the second stage servo tends to move in a like direction, thereby attempting to move the armature 21, the valve stem 23, and the valve body 11, and as a result cause the ports 30 and 31 to be blocked by the valve lands 12 and 13. However, should the spring 27 fail to return the valve body 11 to its proper position, because of the first stage valve being wedged in a certain position, due to foreign material lodged between the valve and the valve chamber, then after the space between the tongue 56 and the groove 55 has been overcome by movement of the spool valve 33 and the consequent movement of member 46 and stationary position of the armature 21, a direct connection between armature 21 and member 46 occurs, thereby forcing movement of armature 21, valve stem 23, valve body 11, and shearing or grinding of the foreign material found in the valve chamber inhibiting valve movement.

The modification shown in Figure 2 operates in a manner similar to that of the arrangement of Figure 1 with the exception that in Figure 2 the servo valve is of single stage design whereas in Figure 1 the servo valve is of a two stage design. Thus, the movement of the actuator stem 150 of Figure 2 directly controls the condition control element 66.

The mode of operation for Figure 3 is the same as that for Figure 1, as only the configuration and not the function of the torque motor and first stage servo of Figure 3 have been changed.

Although the embodiments shown in the specification are directed to the use of the combination of a resilient member and a device containing a negative feedback arrangement, it is apparent that there are situations when the resilient member can be dispensed with. For example, in some servomechanism systems, where there is no need for high response, the change in error signal can be supplied directly to the torque motor in the form of electrical current, thus causing repositioning of the valve without the need of a mechanical incremental feedback device.

Similarly, all the embodiments shown in the specification are directed to the use of a lost motion device in conjunction with the feedback arrangement. Again, other forms of negative feedback are possible. For example, an arrangement could be devised such that when the torque motor was incapable of moving the first stage valve, the resulting overtravel in the second stage valve or actuator would cause the opening of an auxiliary valve and porting of pressure fluid to an auxiliary cylinder and placing a force on the piston thereof, thereby moving the piston, bringing it to bear on the torque motor armature, repositioning it and the first stage valve.

Only a few embodiments of the present invention are herein shown. However, numerous modifications are possible, and it is to be understood that the present invention is to be determined only by the claims.

What is claimed is:

1. In combination, a structure arranged to be connected to a source of hydraulic pressure, a servo valve means comprising a valve member in a valve body, an actuator, a control member, torque motor means being attached to said servo valve means, whereby said actuator is controlled by said servo valve means, said servo valve means being actuated by a torque motor means including an armature, said armature acting on a rod attached to said armature and to said servo valve member, whereby said actuator moves in response to the fluid transmitted thereto from said servo valve means, a spring attached to said armature operably connected to a portion of said actuator extending beyond the servo valve body, a bar forked at one end extending toward said torque motor armature and attached to a portion of said actuator at a portion of the valve extending beyond the valve body in such a position that the forked notch of said bar which is somewhat larger than said armature will straddle said armature thus enabling said valve member to be transferred to a new position and be subject to the spring tension caused by relative movement of said valve member and said actuator, but upon failure of such spring arrangement to cause valve member movement the valve member will be moved by the direct connection which occurs between said forked bar and said armature after the space between the two bars has been taken up by said relative movement resulting in the elimination of the obstacle standing in the way of said valve member movement.

2. A control device comprising a servo value and a torque motor, said servo valve having two stages fluidly interconnected wherein the first stage valve is connected to and actuated by the armature of said torque motor and wherein the second stage valve moves in response to the fluids transmitted thereto from said first stage valve, and a feedback arrangement including a spring attached to said armature and to a movable portion of said second stage valve and a lost motion connection including a portion of said armature as a first member and a second member, one of the members of the lost motion means being forked at one extremity, the forked opening of said one member being somewhat larger than the other member, said second member being attached in such a manner to a movable portion of said second stage valve so that the member containing the forked portion will straddle the other member thus enabling said first stage valve to be transferred to a new position and be subject to the spring tension caused by relative movement of said first stage valve and said second stage valve and upon failure of such spring arrangement to cause first stage valve movement said first stage valve to be transferred to a new position by the direct connection which occurs between said armature and said second member after the lost motion between said armature and said second member has been overcome resulting in the elimination of any obstacle tending to prevent first stage valve movement.

3. The combination comprising a servo means adapted to receive a signal from an outside source, an actuator, said actuator being controlled by said servo means so that said actuator moves in response to movement of said servo means, a resilient member operably connecting said servo means and said actuator, and mechanical coupling comprising two rigid members operably connected to said servo means and said actuator, said coupling having a lost motion connection therein whereby positive engagement between said members occurs when said resilient member moving with the actuator fails to cause servo means movement due to foreign material causing binding in said servo means and when said lost motion has been taken up.

4. In a control system, the combination comprising valve means adapted to receive a signal from an outside source for operation thereof, actuator means, fluid connecting means between said valve means and said actuator means whereby said actuator means is controlled by said valve means, and feedback means between said valve means and said actuator means comprising a first resilient member and a second mechanical member having a predetermined range of lost motion with respect to said valve means, each member operably connecting said valve to said actuator means, said mechanical member providing positive movement of said valve means by movement of said actuator means by displacement of any foreign material lodged in said valve means which cannot be dislodged by action of said resilient member.

5. In a system consisting of two members and means connecting said members, the combination comprising a first of said members movable upon reception of a signal from an outside source to cause relative movement of the second member, resilient means, and means containing a lost motion connection interposed between and operably connecting said first and second members, said resilient means being arranged to transfer a feed back signal from said second member so said first member upon movement of said second member and said lost motion connection being arranged to transmit the feedback signal by positive engagement between said members after take-up of the lost motion therein should said resilient means be incapable of so doing.

6. In combination a structure arranged to be connected to a source of hydraulic pressure, a servo valve, an actuator fluidly connected to said servo valve whereby said actuator moves in response to fluid transmitted thereto from said servo valve, and feedback apparatus including a resilient means attached to a movable portion of the servo valve and to a movable portion of said actuator and lost motion means comprising a first member and a second member, one of the members of said lost motion means being forked at one extremity the forked opening of said one member being somewhat larger than the other member, one of said members being attached to a movable portion of said servo valve and the other of said members being attached to a movable portion of said actuator so that the member containing the forked portion will straddle the other member thus enabling said servo valve to be transferred to a new position and be subject to the tension developed in said resilient means resulting from relative movement of said servo valve and said actuator, and upon failure of said resilient arrangement to cause servo valve movement the valve will be transferred to a new position by the direct connection which occurs between said first member and said second member after the lost motion between said first and second members has been taken up thereby eliminating any obstacle standing in the way of said servo valve movement.

7. In combination, a device connectable to a source of fluid pressure, a control valve, an actuator fluidly connected to said control valve, said actuator being controlled by said control valve, and feedback apparatus including resilient means operably attached to a movable portion of both said control valve and said actuator and further means including a lost motion connection operably attached to a movable portion of both said control valve and said actuator, said control valve, actuator, said feedback apparatus being so arranged that movement of said actuator under the direction of said control valve causes said resilient means to tend to position said control valve in its neutral position and upon continued actuator movement without consequent control valve movement to its neutral position and the lost motion of the lost motion connection having been taken up to move said control valve by a direct connection resulting between said control valve and said actuator.

References Cited in the file of this patent

UNITED STATES PATENTS

| | | |
|---|---|---|
| 814,400 | Schmitthenner | Mar. 6, 1906 |
| 2,139,981 | Sugihara | Dec. 13, 1938 |
| 2,409,517 | Schmit | Oct. 15, 1946 |
| 2,646,820 | McLeod | July 28, 1953 |

FOREIGN PATENTS

| | | |
|---|---|---|
| 809,571 | Germany | July 30, 1951 |